US010425898B2

(12) United States Patent
Hessler et al.

(10) Patent No.: US 10,425,898 B2
(45) Date of Patent: Sep. 24, 2019

(54) METHODS AND ARRANGEMENTS RELATING TO PROVISION OF BEAM COVERAGE FOR A COMMUNICATION DEVICE OPERATING IN A WIRELESS COMMUNICATION NETWORK

(71) Applicant: Telefonaktiebolaget LM Ericsson (publ), Stockholm (SE)

(72) Inventors: Martin Hessler, Linköping (SE); Pål Frenger, Linköping (SE); Jonas Fröberg Olsson, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 15/569,427

(22) PCT Filed: Oct. 4, 2017

(86) PCT No.: PCT/SE2017/050970
§ 371 (c)(1),
(2) Date: Oct. 26, 2017

(87) PCT Pub. No.: WO2018/067059
PCT Pub. Date: Apr. 12, 2018

(65) Prior Publication Data
US 2019/0007906 A1 Jan. 3, 2019

Related U.S. Application Data

(60) Provisional application No. 62/405,319, filed on Oct. 7, 2016.

(51) Int. Cl.
*H04W 52/02* (2009.01)
*H04B 7/06* (2006.01)
(Continued)

(52) U.S. Cl.
CPC ...... *H04W 52/0245* (2013.01); *H04B 7/0617* (2013.01); *H04B 7/0626* (2013.01);
(Continued)

(58) Field of Classification Search
None
See application file for complete search history.

(56) References Cited

U.S. PATENT DOCUMENTS

| 10,069,555 | B2 * | 9/2018 | Islam | H04B 7/0639 |
| 2002/0137538 | A1 * | 9/2002 | Chen | H04B 7/0491 |
| | | | | 455/575.7 |
| 2005/0136929 | A1 * | 6/2005 | Iacono | H01Q 3/247 |
| | | | | 455/436 |
| 2005/0143132 | A1 | 6/2005 | Proctor et al. | |
| 2016/0323755 | A1 * | 11/2016 | Cordeiro | H04J 13/0014 |

(Continued)

FOREIGN PATENT DOCUMENTS

EP 2498415 A1 9/2012

*Primary Examiner* — Donald L Mills
(74) *Attorney, Agent, or Firm* — Murphy, Bilak & Homiller, PLLC

(57) ABSTRACT

Method by a communication device (120) for managing beam coverage. The device receives and evaluates (201) first reference signals transmitted by a network node. The first reference signals are comprised in first beams. The first beams are static or semi-static. The receiving and evaluating is according to a first state, wherein the device refrains from reporting back about the first reference signals. In response to the conclusion that all of the first reference signals are too weak and/or of too low quality by comparison to a threshold, the device sends (202) a request to one or more network nodes (110, 111), requesting a certain procedure for providing, by beamforming, one or more second beams (127, 128) specifically to target the device. The second beams (127, 128) comprise one or more second reference signals. The device switches, to a second state. wherein the device actively participates in the provision of beam coverage and is in a battery-saving mode.

28 Claims, 8 Drawing Sheets

(51) Int. Cl.
*H04L 5/00* (2006.01)
*H04W 16/28* (2009.01)
*H04W 24/08* (2009.01)
*H04W 24/10* (2009.01)
*H04W 72/04* (2009.01)
*H04B 17/24* (2015.01)

(52) U.S. Cl.
CPC ......... *H04B 7/0695* (2013.01); *H04L 5/0048* (2013.01); *H04W 16/28* (2013.01); *H04W 24/08* (2013.01); *H04W 24/10* (2013.01); *H04W 52/0229* (2013.01); *H04W 72/046* (2013.01); *H04B 17/24* (2015.01); *Y02D 70/10* (2018.01); *Y02D 70/12* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/21* (2018.01); *Y02D 70/24* (2018.01); *Y02D 70/25* (2018.01); *Y02D 70/444* (2018.01)

(56) References Cited

U.S. PATENT DOCUMENTS

| | | | |
|---|---|---|---|
| 2017/0006593 A1* | 1/2017 | Liu | H04W 16/32 |
| 2017/0070275 A1* | 3/2017 | Jo | H04B 7/0619 |
| 2017/0195998 A1* | 7/2017 | Zhang | H04B 7/086 |
| 2017/0251518 A1* | 8/2017 | Agiwal | H04W 24/08 |
| 2017/0302355 A1* | 10/2017 | Islam | H04B 7/0639 |
| 2017/0373731 A1* | 12/2017 | Guo | H04B 1/707 |
| 2018/0054245 A1* | 2/2018 | Trainin | H04W 16/28 |
| 2018/0102826 A1* | 4/2018 | Raghavan | H04B 7/0617 |
| 2018/0309496 A1* | 10/2018 | Lee | H04L 5/0044 |

* cited by examiner

METHODS AND ARRANGEMENTS RELATING TO PROVISION OF BEAM COVERAGE FOR A COMMUNICATION DEVICE OPERATING IN A WIRELESS COMMUNICATION NETWORK

TECHNICAL FIELD

Embodiments herein relate to methods and arrangements in a wireless communication network, e.g. telecommunication network, relating to provision of beam coverage for a communication device operating in a wireless communication network, e.g. a Fifth Generation (5G) or New Radio (NR) network. In particular, the present disclosure relates to a communication device and methods performed thereby for managing beam coverage of the communication device in a wireless communication network. The present disclosure relates as well to a first network node and methods performed thereby for managing beam coverage of the communication device in a wireless communication network.

BACKGROUND

Communication devices such as wireless communication devices, that simply may be named wireless devices, may also be known as e.g. User Equipments (UEs), mobile terminals, wireless terminals and/or Mobile Stations (MS). A wireless device is enabled to communicate wirelessly in a wireless communication network that typically is a cellular communications network, which may also be referred to as a wireless communication system, or radio communication system, sometimes also referred to as a cellular radio system, cellular network or cellular communication system. A wireless communication network may sometimes simply be referred to as a network and abbreviated NW. The communication may be performed e.g., between two wireless devices, between a wireless device and a regular telephone and/or between a wireless device and a server via a Radio Access Network (RAN) and possibly one or more Core Networks (CN), comprised within the wireless communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type Communication (MTC) devices, i.e. a device that is not necessarily associated with a conventional user, such as a human, directly using the device. MTC devices may be as defined by 3GPP:

The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g., macro eNodeB, home eNodeB or pico base station, based on transmission power and thereby also cell size. A cell is typically identified by one or more cell identities. The base station at a base station site provides radio coverage for one or more cells. A cell is thus associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g., a Radio Network Controller (RNC) in Universal Mobile Telecommunication System (UMTS), and/or to each other. The radio network controller, also sometimes termed a Base Station Controller (BSC) e.g., in GSM, may supervise and coordinate various activities of the plural base stations connected thereto. GSM is an abbreviation for Global System for Mobile Communication (originally: Groupe Spécial Mobile).

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices.

General Packet Radio Service (GPRS) is a packet oriented mobile data service on the 2G cellular communication system's global system for mobile communications (GSM).

Enhanced Data rates for GSM Evolution (EDGE) also known as Enhanced GPRS (EGPRS), or IMT Single Carrier (IMT-SC), or Enhanced Data rates for Global Evolution is a digital mobile phone technology that allows improved data transmission rates as a backward-compatible extension of GSM.

High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G). A design principle under consideration for 5G wireless communication networks is to base it on an ultra-lean design. This implies that "always on" or frequent signals, may need to be avoided in the network as much as possible. The expected benefit from this design principle is expected to be significantly lower network energy consumption, better scalability, higher degree of forward compatibility, lower interference from system overhead signals and consequently higher throughput in low load scenario, and also improved support for user centric beam-forming.

Advanced Antenna Systems (AAS) is an area where technology has advanced significantly in recent years and where a rapid technology development in the years to come is also foreseen. Hence, it may be natural to assume that advanced antenna systems in general and massive Multiple Input Multiple Output (MIMO) transmission and reception in particular, will be a cornerstone in a future 5G wireless communication network.

As beam-forming becomes increasingly popular and capable, it becomes natural to use it not only for transmission of data but also for transmission of control information. This is one motivation behind the relatively new control channel in LTE known as enhanced Physical Downlink Control CHannel (ePDCCH). When a control channel is beam-formed, the cost of transmitting the overhead control information may be reduced due to the increased link budget provided by additional antenna gain. This is a good property that may likely be utilized also for 5G, perhaps to an even larger degree than what is possible in the currently in LTE.

In many wireless communications systems CSI (Channel-State Information) feedback may be considered crucial for obtaining good performance. Reference signals may be transmitted which may be used to estimate the channel state, whereupon the reported CSI feedback may typically include a CQI (Channel-Quality Indicator) and RI (Rank Indicator) value. More detailed reports may include frequency-selective CQI and/or PMI (Pre-coding Matrix Indicator) values.

The 3GPP LTE (Long Term Evolution) system supports CSI-reporting schemes that rely on the reference symbols being transmitted periodically; the cell-specific reference symbols (CRS) may be sent every subframe, while the user-specific CSI-RS may be sent with a larger periodicity. UEs using transmission mode 10 (TM10) may rely solely on CSI-RS resources, while other UEs typically use the CRS at least for interference measurements. Furthermore, UEs using TM10 may be configured with multiple CSI processes, each estimating and reporting CSI of a specific channel and interference situation, while other transmission modes may only support a single CSI process.

When a UE is in active mode it may be all the time prepared to, in an optimized way, receive and transmit data from/to the network, which means that a UE in active mode is configured with one or more CSI processes and CSI are continuously reported to the network. However, when the UE is in idle mode the UE, to save battery life-time, typically passively monitors RSRP (Reference Signal Received Power) of CRSs of cells it may be able to detect. As long as the UE moves in an area within the current tracking area, the area served by cells that may reach/page the UE, the UE does not communicate with the network. Only if the UE approaches an area outside its current tracking area it may need to initiate communication with the network and go to active state in order to perform a tracking-area-update. In the tracking-area update, the UE needs to communicate with the core network and therefore it initiates communication with the eNB in order to be able to transmit and receive data. The UE will be configured to one or more CSI processes that will be used by network to efficiently transmit data, e.g. proper selection of rank, modulation and coding, and pre-coder.

In NR, it is planned to include an alternative/additional state, which may be named a dormant state where the UE may still be configured but not active, e.g., as when connected and able to transmit and receive data, e.g., user data. This state may be described as somewhere in between the legacy, i.e., conventional idle and active modes/state.

In 5G, network nodes are expected to support many antenna elements that enable beamforming transmitted energy towards the UE. This has the advantage of improving radio coverage of the UE. However, the signalling overhead expected to be involved for a UE to report the radio conditions to the network is significant due to the increased number of beams the UE may need to measure and report back to the network.

SUMMARY

It is an object to alleviate or at least reduce one or more problems indicated herein.

Hence, the object may be to provide one or more improvements with regard to how to provide radio coverage, e.g. beams, to a communication device in order to facilitate establishing connection to a wireless communication network, e.g., a 5G or NR network. The improvements may e.g. relate to said dormant mode.

According to a first aspect of embodiments herein, the object is achieved by a method performed by a communication device. The method is for managing beam coverage of the communication device in a wireless communication network. The communication device receives and evaluates one or more first reference signals transmitted by a first network node 10 comprised in the wireless communication network. The one or more first reference signals are comprised in one or more first beams. The one or more first beams are static or semi-static beams. The receiving and evaluating is according to a first state of the communication device. When in the first state, the communication device refrains from reporting back in the uplink about the received and evaluated one or more first reference signals. In response to the evaluation having resulted in a conclusion that all of the received one or more first reference signals are too weak and/or of too low quality by comparison to a threshold value, the communication device sends a request to one or more network nodes, requesting a certain procedure for providing, by beamforming, one or more second beams specifically to target the communication device. The requested one or more second beams comprise one or more second reference signals. The communication device switches, based on the evaluation, from the first state to a second state. The communication device in the second state actively participates in the provision of beam coverage for the communication device. In the second state, the communication device is in a battery-saving mode.

According to a second aspect of embodiments herein, the object is achieved by a method performed by a first network node. The method is for managing beam coverage of the communication device. The first network node and the communication device are comprised in the wireless communication network. The first network node transmits the one or more first reference signals. The one or more first reference signals are comprised in the one or more first beams. The one or more first beams are static or semi-static beams. The first network node receives, from the communication device, the request requesting the certain procedure for providing, by beamforming, the one or more second beams specifically to target the communication device. The requested one or more second beams comprise the one or more second reference signals. The first network node participates, based on the received request, in performing the certain procedure, wherein the first network node actively participates with the communication device in the provision of beam coverage for the communication device, in the battery-saving mode for the communication device.

According to a third aspect of embodiments herein, the object is achieved by the communication device configured to manage beam coverage of the communication device in the wireless communication network. The communication device is further configured to receive and evaluate the one or more first reference signals configured to be transmitted by the first network node comprised in the wireless communication network. The one or more first reference signals are configured to be comprised in the one or more first beam. The one or more first beams are configured to be static or semi-static beams. To receive and to evaluate is configured to be according to a first state of the communication device. When in the first state, the communication device is configured to refrain from reporting back in the uplink about the received and evaluated one or more first reference signals. In response to the evaluation having resulted in the conclusion that all of the received one or more first reference signals are too weak and/or of too low quality by comparison to the threshold value, communication device is further configured to send the request to the one or more network nodes requesting the certain procedure for providing, by beamforming, the one or more second beams specifically to target the communication device. The one or more second beams configured to be requested comprise one or more second reference signals. The communication device is configured to switch, based on the evaluation, from the first state to the second state. The communication device in the second state is configured to actively participate in the provision of beam coverage for the communication device. In the second state, the communication device is configured to be in the battery-saving mode.

According to a fourth aspect of embodiments herein, the object is achieved by the first network node, configured to manage beam coverage of the communication device. The first network node and the communication device are configured to be comprised in the wireless communication network. The first network node is further configured to transmit the one or more first reference signals. The one or more first reference signals are configured to be comprised in the one or more first beams. The one or more first beams are configured to be static or semi-static beams. The first network node is further configured to receive, from the communication device, the request requesting the certain procedure for providing, by beamforming, the one or more second beams specifically to target the communication device. The one or more second beams are configured to comprise the one or more second reference signals. The first network node is further configured to participate, based on the request configured to be received, in performing the certain procedure. The first network node is configured to actively participate with the communication device in the provision of beam coverage for the communication device, in the battery-saving mode for the communication device.

According to a fifth aspect of embodiments herein, the object is achieved by a computer program. The computer program comprises instructions which, when executed on at least one processor, cause the at least one processor to carry out the method performed by the communication device.

According to a sixth aspect of embodiments herein, the object is achieved by computer-readable storage medium. The computer-readable storage medium has stored thereon a computer program comprising instructions which, when executed on at least one processor, cause the at least one processor to carry out the method performed by the communication device.

According to a seventh aspect of embodiments herein, the object is achieved by a computer program. The computer program comprises instructions which, when executed on at least one processor, cause the at least one processor to carry out the method performed by the first network node.

According to an eighth aspect of embodiments herein, the object is achieved by computer-readable storage medium. The computer-readable storage medium has stored thereon a computer program comprising instructions which, when executed on at least one processor, cause the at least one processor to carry out the method performed by the first network node.

By receiving and evaluating the one or more first reference signals according to the first state, wherein the communication device refrains from reporting back about the one or more first reference signals, the communication device is enabled to passively monitor the first reference signals comprised in the static or semi-static beams without unnecessary signalling, saving battery. The first network node may similarly save power and processing resources by transmitting the static or semi-static first beams, which involves less signalling and power. However, by, in response to the one or more first reference signals being too weak and/or of too low quality, sending the request requesting the certain procedure and switching to the second state, actively participating in the provision of beam coverage in a battery-saving mode, the communication device is enabled to, only when it may be necessary, e.g., when coverage is bad, engage itself and the first network node in a more optimized beam coverage provided by the second beams. While the second state may improve the coverage of the communication device by the one or more second beams which specifically target the communication device, but which may involve more signalling and processing resources for both the communication device and the first network node, the communication device still saves battery by being in a battery-saving mode.

Embodiments herein may be understood to concern adding an active beam-tracking procedure to be used for and by some UEs and may be used to enable active beam-tracking in the network, thereby enabling a lean system with less beamformed measurement signals than else may be the case. Hence, for example, unless a UE is in a bad coverage situation, as long as the UE is in a position where good system performance may be possible with at least network side beamforming, the system may allow the UE to passively monitor first reference signals, in a similar way to existing methods. But if a UE demands active beam-tracking, the UE may then wake up, at least partly, and start to participate in the beam-tracking procedure, e.g. by providing feedback in the uplink regarding further, such as second reference signals.

BRIEF DESCRIPTION OF THE DRAWINGS

The various aspects of embodiments disclosed herein, including particular features and advantages thereof, will be readily understood from the following detailed description and the accompanying drawings, in which FIGS. 1-9 are shown, according to the following description.

FIG. 1 is a schematic representation illustrating an example of a wireless communication network, according to embodiments herein.

FIG. 2 is a schematic block diagram illustrating an embodiment of a communication device, according to embodiments herein.

FIG. 3 is a schematic representation illustrating an example of some actions and relations for a UE operating according to some embodiments herein, according to embodiments herein.

FIG. 4 is a flowchart depicting a method in a first network node, according to embodiments herein.

FIG. 5 illustrates schematically, in a combined signaling diagram and flowchart, various actions and relations in embodiments herein.

FIG. 6 schematically illustrates shows a procedure for how beamforming may be used, e.g. for the second state.

FIG. 7 is a schematic block diagram illustrating an embodiment of a device, according to embodiments herein.

FIG. 8 is a schematic block diagram illustrating an embodiment of an arrangement, according to embodiments herein.

DETAILED DESCRIPTION

Figure 1:
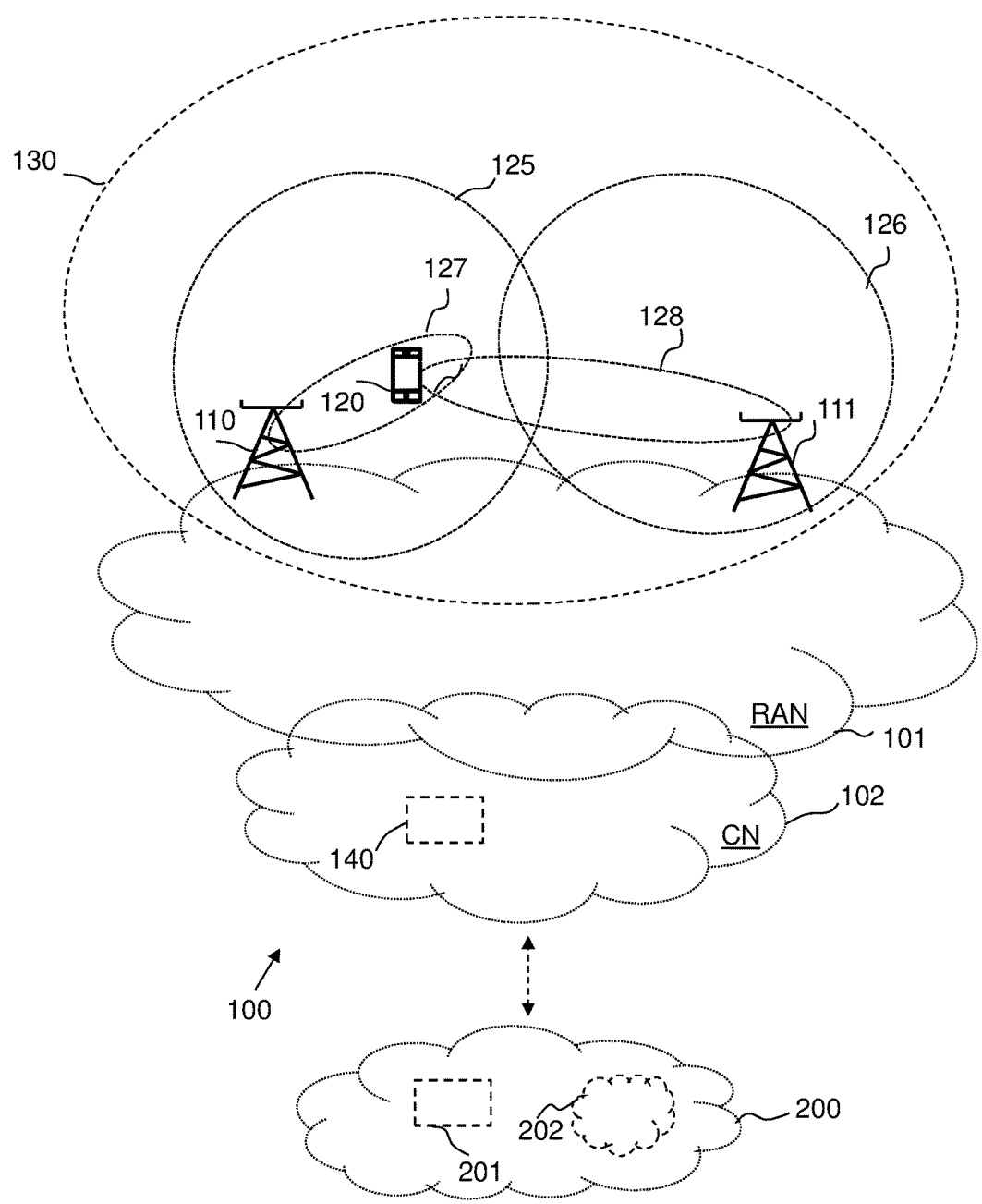

Throughout the following description, similar reference numerals may be used to denote similar elements, units, modules, circuits, nodes, parts, items or features, when applicable. In the Figures, features that appear only in some embodiments are typically indicated by dashed lines.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

As part of a development towards embodiments herein, the problems indicated in the Background will first further be discussed.

In 5G, network nodes are expected to support many antenna elements that enable beamforming transmitted energy towards the UE. Also, the UEs are expected to support beamforming, but perhaps not as much as network nodes. Beamforming has the advantage that UEs may be reached further away from the network node if beamforming is applied than if beamforming is not applied. However, the signalling overhead and battery consumption expected to be involved for a UE to report the radio conditions to the network is significant, as mentioned earlier.

In one approach that has been discussed to achieve coverage, a 5G UE, despite the fact that it may have no data to send or receive, will more often be in active mode just due to that beamforming may need to be updated. This is because the UE may be moving, which means that the beamforming may need to be regularly updated or changed, to provide coverage to the UE.

Another approach may be that a UE passively monitors beamformed reference signals, e.g., of a serving area, and, as long as it hears, that is, detects, at least one good enough, it may not initiate connection with the network, since the UE knows that if it needs to perform a transmission, it is possible to initiate connection with the network. A Serving Area (SA) is similar to, or at least has similar purpose as, a tracking area in LTE. The SA may instead of using a single CRS per "cell", use multiple Beam Reference Signals (BRS). In this approach, the network may need to repeatedly, or even close to periodically, transmit all beams so that each beam may be evaluated by UEs that may be passive. This may be understood to be in contrast to active mode, when there may be active beam monitoring, where a UE may continuously report a quality for candidate beams. If one beam is currently best, then when the UE moves, only a subset of all beams may be possible to be better than the current beam considered to be best. To transmit all beams so that each beam may be evaluated by UEs that may be passive has the advantage that a UE may not need to communicate with the network as long as it may hear at least one beam strong enough, but the disadvantages include that the network needs to scan through all beams, so the passive UE may evaluate them, which costs downlink resources. Scan through all beams may mean to transmit RS using all beams, e.g., in a SA where the UE is located, using time/frequency resources, e.g., 8 beams per OFDM symbol in 8 OFDM symbols to scan 64 beams. The disadvantages may also include that, if the network needs to connect/page the UE to setup a data connection, it only knows that there is at least one beam that works, but not which one. This may be understood to be because the UE may monitor beams scanned by the gNB and only indicate to the gNB if no beam is found to be above a threshold. Hence, as long gNB does not hear from the UE, the gNB knows that at least one beam is above threshold, which is possible to use for communication, but the gNB does not know which one. Therefore, there may need to be some procedure to determine which beam to use. One possibility may then be to page the UE in all possible beams and let the UE initiate a connection with the network indicating which beam it hears. However, with a large number of beams the paging overhead will be significant.

Embodiments herein introduce a procedure, that may relate to a dormant procedure, e.g. in the UE, where the UE may inform the network about the need for certain beam-formed reference signals, e.g., by means of a beam activation signal. This beam-activation signal may allow the UE and network to switch between a passive state for the UE, that may be "a low cost" configuration state to monitor and evaluate beam transmissions from a network node, and an active beam-tracking state, that may be a high coverage configuration state with active beam transmissions, such as active beam forming and/or tracking. Embodiments herein may therefore allow lower energy consumption for the UE while still enabling the UE to be in good coverage by taking advantage of the beamforming coverage with multiple beams.

FIG. 1 is a schematic block diagram schematically depicting an example of a wireless communication network 100 that is relevant for embodiments herein and in which embodiments herein may be implemented. The wireless communication network 100 may comprise a Radio Access Network (RAN) 101 part and a core network (CN) 102 part. The wireless communication network 100 is typically a telecommunication network or system, such as a cellular communication network that supports at least one Radio Access Technology (RAT), e.g., New Radio (NR) that also may be referred to as 5G.

The wireless communication network 100 comprises network nodes that are communicatively interconnected. The network nodes may be logical and/or physical and are located in one or more physical devices. The wireless communication network 100 comprises a first network node 110, and a second network node 111, typically radio network nodes, i.e. network nodes being or comprising a radio transmitting network nodes, such as base stations, and/or that are being or comprising controlling nodes that control one or more radio transmitting network nodes. Herein, any of the first network node 110 and the second network node 111, or both, may be referred to as one or more network nodes 110, 111.

The wireless communication network 100, or specifically one or more network nodes thereof, e.g. the first network node 110 and the second network node 111, is typically configured to serve and/or control and/or manage one or more communication devices, such as communication device 120, in radio coverage areas, i.e. an area where radio coverage is provided for communication with one or more communication devices.

Each radio coverage may be provided by and/or associated with a particular RAT. For embodiments herein, there is typically only one RAT is involved and that may be NR or 5G and the radio coverage is typically provided by radio beams, typically named only beams, or of a set or group of radio beams. The set or group may be radio beams that are transmitting identical identifiers for identifying the beams, e.g. all radio beams provided by one or more network nodes that transmit the same identifier, or in other words that have a common identifier. As should be recognized by the skilled person, a so called beam may typically correspond to a more dynamic and relatively narrow and directional radio coverage compared to a conventional cell, and may be accomplished by so called beamforming. A beam may be for serving one or a few communication devices at the same time, and may be specifically set up for serving this one or few communication devices. Some beams may be changed dynamically and/or actively by beamforming to provide desirable coverage for the one or more communication devices. Similar to a cell, a beam may be typically associated with a beam identity, that may be transmitted by the beam, and that in turn may be typically, directly or indirectly, also identifying the network node providing the beam. Such identifier mentioned above that may be the same for the set or group of beams, may directly or indirectly identify the beams of the set or group, e.g., by their beam identities, and similarly also identify the network node, or nodes, providing said set or group of beams.

In the shown example there is a first beam 125 and another first beam 126, that correspond to radio coverage areas, respectively. The first beams may be static beams, each with a radio coverage similar to that of a cell and may be named wide-beams, in the shown example provided by the first and second network nodes 110, 111, respectively. It may be understood that the first network node 110 may transmit one or more first beams, such as the first beam 125, as described. Similarly, the second network node 112 may be understood to transmit another one or more first beams, such as the another first beam 126 described. There is also a second beam 127 and another second beam 128, that correspond to radio coverage areas respectively. These may be more narrow beams and may be provided more specifically to target the communication device 120, e.g., by active beam forming, and may change depending on feedback from and/or the location of the communication device 120. It may be understood that each of the one or more network nodes 110, 111 may transmit one or more second beams, such as the second beam 127 and the another second beam 128, described.

There may be one or more defined Service Areas (SAs), e.g. a SA 130, that may correspond to a Tracking Area (TA), which may be an example of a certain area with predefined and/or predetermined reference signals transmitted therein, and/or beams, which reference signals may identify beams being provided by network nodes, e.g. the first beams 125, 126, which beams may thus provide radio coverage of the SA and comprise said reference signals. The SA may thus be defined and/or correspond to beams that provide radio coverage of the SA, e.g., the first beams 115, 116.

Further, the wireless communication network 100 may comprise one or more central nodes, e.g. a central node 140, i.e., one or more network nodes that may be common or central and communicatively connected to multiple other nodes, e.g., multiple radio network nodes, and may be for managing and/or controlling these nodes. For example, a first central node 140 may e.g., be an Operation and Maintenance (OAM) node and a second central node may e.g., be an entity for managing identifiers, such as an Identifier Management Entity (IME), that may be separate from an OAM node. In some embodiments, the second central node may be a Positioning Management (PM) node or PM Entity (PME). The one or more central nodes may be comprised in the CN 102, and may thus be or comprise one or more core network nodes, and/or may e.g. be one or more internal management nodes of the wireless communication network 100.

The wireless communication network, e.g., the CN 102, may further be communicatively connected to, and thereby e.g., provide access for said communication devices, to an external network 200, e.g. the Internet. The communication device 120 may thus communicate via the wireless communication network 100, with the external network 200, or rather with one or more other devices, e.g., servers and/or other communication devices connected to other wireless communication networks, and that may be connected with access to the external network 200.

Moreover, there may be one or more external nodes, e.g., an external node 201, for communication with the wireless communication network 100 and node(s) thereof. The external node 201 may e.g., be an external management node. Such external node may be comprised in the external network 200 or may be separate from it.

Furthermore, the one or more external nodes may correspond to or be comprised in a so called computer, or computing, cloud, that also may be referred to as a cloud system of servers or computers, or simply be named a cloud, such as a computer cloud 202 as shown in the figure, for providing certain service(s) outside the cloud via a communication interface. The exact configuration of nodes etc. comprised in the cloud in order to provide said service(s) may not be known outside the cloud. The name "cloud" is often explained as a metaphor relating to that the actual device(s) or network element(s) providing the services are typically invisible for a user of the provided service(s), such as if obscured by a cloud. The computer cloud 202, or typically rather one or more nodes thereof, may be communicatively connected to the wireless communication network 100, or certain nodes thereof, and may be providing one or more services that e.g., may provide, or facilitate, certain functions or functionality of the wireless communication network 100. The computer cloud 202 may be comprised in the external network 200 or may be separate from it.

Attention is drawn to that FIG. 1 is only schematic and for exemplifying purpose and that not everything shown in the figure may be required for all embodiments herein, as should be evident to the skilled person. Also, a wireless communication network or networks that in reality correspond(s) to the wireless communication network 100 will typically comprise several further network nodes, such as base stations, beams, service areas, etc., as realized by the skilled person, but which are not shown herein for the sake of simplifying the figure.

Embodiments of a first method, performed by the communication device 120, for managing beam coverage of the communication device 120 in the wireless communication network 100, will now be described with reference to the flowchart depicted depicted in FIG. 2. The communication device 120 may be understood to operate in the wireless communication network 100.

The method may comprise the actions described below. In some embodiments all the actions may be performed. One or more embodiments may be combined, where applicable. All possible combinations are not described to simplify the description. Note that shown actions may be taken in any suitable order and/or be carried out fully or partly overlapping in time when this is possible and suitable. Dotted lines attempt to illustrate features that are not present in all embodiments.

Any of the actions below may fully or partly involve and/or be initiated and/or be triggered by another, e.g. external, entity or entities, such as device and/or system, than what may actually be carrying out the actions. Such initiation may e.g. be triggered by said another entity in response to a request from the wireless communication network and/or in response to some event resulting from commutations and/or program code executing in said another entity or entities. Said another entity or entities may correspond to or be comprised in a so called computer cloud, or simply cloud, and/or communication with said another entity or entities may be accomplished by means of one or more cloud services.

Action 201

In order to manage beam coverage of the communication device 120 in the wireless communications network 100 without unnecessary signalling and usage of energy, e.g., without the communication device 120 needing to be in active state, the communication device 120 may receive and evaluate one or more first reference signals transmitted by one or more network nodes, e.g. the first network node 110 and/or the second network node 111, comprised in the wireless communication network 100.

Particularly, in this Action 201, the communication device 120 receives and evaluates one or more first reference signals transmitted by the first network node 110 comprised in the wireless communication network 100. The one or more first reference signals are comprised in the one or more first beams 125, transmitted by the first network node 110. As stated earlier, the one or more first beams 125 are static or semi-static beams. That the one or more first beams 125 may be static, or at least semi-static, beams, may be understood as that the one or more first beams 125 may be beams with a static or semi-static radio coverage, and/or are not configured to change coverage, e.g., by beamforming, based on where one or more devices, e.g., the communication device 120, are located, and/or are not configured to change based on feedback from said one or more devices.

The receiving and evaluating in this Action 201 is according to a first state of the communication device 120, wherein when in the first state, the communication device 120 refrains from reporting back in the uplink about the received and evaluated one or more first reference signals. That is, the communication device 120 may perform the present action 201, i.e. the reception and evaluation of the one or more first reference signals, in response to that the communication device 120 is operating in or according to a first state or mode, e.g., that the communication device 120 may be configured to perform the present action in said first state. The first state may be predefined and/or predetermined and may be named a passive state, referring to that the communication device 120 may not be actively participating in the provision of beam coverage in the first state. The first state may be part of a so called dormant operating mode of the communication device 120.

The communication device 120 may be located in a certain area, such as a Service Area (SA) or Tracking area (TA), of the wireless communication network 100, e.g. the SA 130. The wireless communication network 100 may comprise several such SAs that all together form a total coverage area of the wireless communication network 100.

The one or more first reference signals may be predefined and/or predetermined and may thus be known in advance by the communication device 120, e.g. by pre-configuration, and may e.g., have been configured into the communication device 120 when the communication device 120 first entered said certain area and/or first connected to the wireless communication network 100 when located in said certain area.

The one or more first reference signals may be Channel State Information Reference Signals (CSI-RSs) and/or a Mobility Reference Signals (MRSs). A CSI-RS may be considered a reference signal for enabling or facilitating a receiving device to provide CSI back to the wireless communication network 100, e.g. to the node transmitting the CSI-RS, based on the CSI-RS, i.e. after receipt and evaluation of it.

The one or more first reference signals may be comprised in the one or more first beams 125, respectively, which one or more first beams 125 may be associated with, e.g. covering, the certain area, e.g. SA 130, that the communication device 120 is located in.

The evaluation typically involves measurements on the received one or more first reference signals and/or estimations and/or calculations and/or use of one or more predefined and/or predetermined criteria. For example, the one or more first reference signals may be measured and/or estimated as Reference Signal Received Power (RSRP) and may be evaluated by comparison to a predefined and/or predetermined threshold.

During performance or execution of the present action 201, e.g. when in said first state, the communication device 120 may thus be in the dormant mode, the device may be understood to not need to send, and may refrain from reporting, anything back in the uplink about the received and evaluated one or more first reference signals, even though the communication device 120 may repeatedly evaluate, including e.g., measuring, the one or more first reference signals. It is up to the communication device 120 to take action based on evaluation of the evaluated one or more first reference signals, which is discussed in the next action.

Action 202

The evaluation of Action 201 may result in a conclusion that all of the received one or more first reference signals are too weak and/or of too low quality according to one or more predefined and/or predetermined criteria, e.g. by comparison, to a predefined and/or predetermined threshold value. For example, the one or more first reference signals may be measured and/or estimated as Reference Signal Received Power (RSRP) resulting in RSRP values for the one or more first reference signals that then may be compared to a RSRSP threshold value, or, as should be realized, it is sufficient to compare the best RSRP value with the threshold value.

In response to the evaluation of Action 201 having resulted in a conclusion that all of the received one or more first reference signals are too weak and/or of too low quality by comparison to a threshold value, in this Action 202, the communication device 120 sends a request to the one or more network nodes 110, 111, requesting a certain procedure for providing, by beamforming, the one or more second beams 127, 128 specifically to target the communication device 120. This may be, for supporting, e.g., enabling or improving the ability of, connecting the communication device 120 to the wireless communication network 100. The connection may thus be established based on, such as accomplished by using, at least one of the one or more second beams 127, 128. As should be understood from the above, the one or more first beams 125, each typically has a larger radio coverage area, and e.g. may be considered a wide-beam, compared to any one of the one or more second beams 127, 128, that may be typically more narrow and for providing coverage to only a single device, or at least a much smaller amount of devices than any first beam of the one or more first beams 125.

The requested one or more second beams 127, 128 comprise one or more second reference signals. In some embodiments, the one or more second reference signals may be CSI-RS.

The communication device 120 switches, based on the evaluation of Action 201, from the first state to a second state, or mode, to operate in instead of the first state. The communication device 120, in the second state, actively participates in the provision of beam coverage for the communication device 120. In the second state, the communication device 120 is in a battery-saving mode. In the battery saving mode, it may be understood that data may not be transmitted or received in a throughput optimal way. This may be understood to comprise that, in the battery saving mode, the communication device 120 may not, for example, perform detailed CSI evaluation and reporting such as reporting Pre-coding matrix indicator (PMI) and Channel Quality Index (CQI), since CSI evaluation is computation heavy. The communication device 120 may further only attempt to receive a very limited set of data assignments of data transmissions to minimize battery consumption, e.g., performing a very limited number of the blind decoding of the control channel. Thus, in battery saving mode, the communication device 120 may only attempt to receive assignments of data transmissions at considerably fewer time locations than when the communication device 120 is not in battery saving mode. For example, it may be understood that in the battery saving mode, the communication device 120 is not in an active state, where there may be bearers established for communication. The second state may be predefined and/or predetermined and may be named an active beam-tracking state, referring that the communication device 120 in the second state actively participates in the provision of beam coverage for the communication device 120. Also the second state may be part of a so called dormant operating mode of the communication device 120, or be considered outside it.

Certain may be understood herein as "particular". The certain procedure named above may be a so called active beam-tracking, or forming, procedure. Such procedure may be described as a procedure that the communication device 120 actively takes part in, e.g. as described next, and with purpose to provide, e.g. by beamforming, one or more beams for supporting communication with the communication device 120, e.g. to enable or facilitate the communication device 120 to connect to the wireless communication network 100.

The requested certain procedure may be based on transmissions by the communication device 120, i.e. that the communication device 120 actively takes part in said certain procedure, and/or may be based on beamforming. The transmissions by the communication device 120 and that may be part of the certain procedure may be repeated transmissions or continuous transmissions. The transmissions may comprise or be feedback, e.g. CSI, regarding one or more second reference signals, other than the first reference signals, transmitted by the wireless communication network 100, i.e. by one or more network nodes thereof, e.g. the first network node 110 and/or the second network node 111. Alternatively or additionally, the transmissions by the communication device 120 may comprise or be one or more third reference signals transmitted by the communication device 120 for receipt by the wireless communication network 100, i.e. by the one or more network nodes thereof, e.g. the first network node 110 and/or the second network node 111 and be used to accomplish so called reciprocity based beam-forming and/or beam tracking.

In some embodiments, the active beam-tracking procedure, that is, of the second state, may comprise that the communication device 120 transmits an UL RS used by the network, e.g. the first network node 110 as BS, to calculate a reciprocity based DL beam former. Reciprocity may be understood to mean that the UL and DL channels share some properties, which may be utilized e.g., by measuring on an uplink channel to deduce properties of a DL channel.

In some embodiments, the active beam-tracking procedure may comprise that the communication device 120 measures on a set of first and/or second reference signals, e.g. DL RS beam-formed, and the communication device 120 reports back on at least the best such beam-formed DL-RS.

In some embodiments, the active beam-tracking procedure may comprise that the network, e.g., the first network node 110 as BS, transmits, a DL RS used by the communication device 120 to calculate a reciprocity based UL-beam-former.

In some embodiments, the active beam-tracking procedure may comprise that at least the network, e.g. the first network node 110 as BS, transmits a plurality of DL RS, e.g. CSI-RS, used by the communication device 120 to calculate and report at least one pre-coder. A pre-coder may relate to how reference signals may need to be combined. The information may be encoded into a matrix where each column may be or may correspond to a beam-former. The network, e.g., the first network node 110 such as a BS, may thereby be informed about how the antenna is configured and may interpret and/or use this information when performing beam-tracking.

In some embodiments, the active beam-tracking procedure may comprise that at least the communication device 120 transmits a plurality of UL RS, e.g. SRS, to be used by the network, e.g. the first network node 110 as BS, to calculate and report at least one pre-coder to the communication device 120.

In some embodiments, the active beam-tracking request may comprise that at least one UL-RS is periodically transmitted, and that omission of said UL-RS may start a timer for deactivating the beam-tracking procedure.

In some embodiments, the active beam-tracking procedure may comprise that a periodic UE beam-tracking report may be sent to the network, e.g. the first network node 110, by the communication device 120, i.e., in the UL.

In some embodiments, the UE beam-tracking report may comprise a field for and/or a request requesting deactivation of the active-beam-tracking procedure.

In some embodiments, the UE beam-tracking report may contain a field with and/or information on the measurements of the first reference signal(s), e.g., standard measurement RS.

In some embodiments, the network, e.g. the first network node 110, may transmit a deactivation request or command to the communication device 120 to stop the procedure, and e.g., only perform according to the first state.

In some embodiments the network, e.g. the first network node 110, may evaluate a value of the measurement on the first reference signal(s), e.g. standard measurement RS, in the UE beam-tracking report to determine if deactivation should be performed.

In some embodiments, the active beam-tracking procedure may contain a repeated, e.g., periodic, network, e.g. the first network node 110 such as BS, beam-tracking report sent by the first network node 110 to the communication device 120, i.e. in the DL. This report may be used in the reciprocity case when the network, e.g., the first network node 110 as BS, may measure UL reference signal(s) from the communication device 120, and hence, the communication device 120 may not measure the value, but may need the information reported.

In some embodiments, the network beam-tracking report may contain a field for and/or a request requesting deactivation of active-beam-tracking.

In some embodiments, the network beam-tracking report may contain a field with a value from measurement of a non-beam formed UL-RS. The value may be a "path-gain" estimate without any beam-forming gain, that is, an estimate of what the communication device 120 may get if it switches back to the first, passive state.

In some embodiments, the communication device 120 may evaluate the value of the non-beamformed RS in the network beam-tracking report to determine a UL power setting for the active beam-tracking.

In some examples, the Measurement RS may be a Mobility RS (MRS).

In some examples, the DL beam tracking RS may be one or more CSI-RS.

According to the foregoing, in some embodiments, the communication device 120, in said certain procedure, may actively participate in the provision of beam coverage for the communication device 120 by performing one or more the following: a) transmitting an uplink, UL, reference signal, RS; b) measuring on a set of DL RS beam-formed, and reporting on at least the best such beam-formed DL RS; c) receiving a DL RS from at least one of the one or more network nodes 110, 111 and using the received DL RS to calculate a reciprocity based UL precoder; d) receiving a plurality of DL RS from at least one of the one or more network nodes 110, 111 and using the received plurality of DL RS to calculate and report at least one pre-coder; e) transmitting a plurality of UL RS, and receiving a report of at least one pre-coder from at least one of the one or more network nodes 110, 111 based on the transmitted plurality of UL RS; f) transmitting at least one UL RS periodically, wherein omission of the UL RS starts a timer for deactivating the second state; g) sending a periodic beam-tracking report in the UL; h) receiving a deactivation from at least one of the one or more network nodes 110, 111; i) receiving a periodic beam-tracking report from at least one of the one or more network nodes 110, 111; and j) evaluating a value of a non-beamformed RS in a beam-tracking report from at least one of the one or more network nodes 110, 111 to determine an UL power setting for the second state.

In some embodiments, the communication device 120 may send the periodic beam-tracking report in the UL and one or more the following may apply: a) the beam-tracking report from the communication device 120 may contain a field for requesting deactivation of the second state; and b) the beam-tracking report from the communication device 120 may contain a field with measurements of a standard measurement RS.

In some embodiments, the communication device 120 may receive the periodic beam-tracking report from at least one of the one or more network nodes 110, 111, and one or more the following may apply: a) the beam-tracking report from at least one of the one or more network nodes 110, 111 may contain a field for requesting deactivation of the second state; and b) the beam-tracking report from at least one of the one or more network nodes 110, 111 may contain a field with a value of a non-beamformed UL RS.

Action 203

In some embodiments, the communication device 120 may, in this Action 203, receive and evaluate, in response to the sent request in Action 202, the one or more second reference signals comprised in the requested one or more second beams 127, 128 transmitted by the one or more network nodes 110, 111.

The present action 203, that is, the reception and evaluation of the one or more second reference signals, may be in response to that the communication device 120 has switched to and is operating in the second state.

The one or more second reference signals may be received, based on that the communication device 120 first may have received, in response to the sent request in Action 202, information from the wireless communication network 100, i.e. from the one or more nodes thereof, e.g. the first network node 110 and/or the second network node 111, about, e.g. identifying, one or more second reference signals that the wireless communication network 100 may have assigned to be used in the requested certain procedure. That is, the communication device 120 may thereby be enabled to receive and evaluate the one or more second reference signals.

In some embodiments, the assignment of the second reference signals may be according a semi-static configuration. In some embodiments, the assignment of the second reference signals may be based on dynamic assignments. The assignments may be sent comprised in a Downlink Control Information (DCI) message.

Advantages of embodiments herein, with two operation "stages" as described above, that may be two states, and how to request switch between them, may e.g., include power saving and increased flexibility compared to conventional solutions. In the first state, there may need to be no uplink transmission at all. Furthermore, relatively simple, similar to conventional, provision of beam coverage and reference signals may be used, but at lower power levels than conventionally, since there may be no need to provide power to the first beams 115, e.g. wide beams, in a large area just to cover one or a few devices if they happen to be at some locations where it may be difficult to provide sufficient radio coverage. Such a device may, and only when it may be actually needed, be handled by means of the second state. The second state may thus "be activated" and used when needed, which in practice typically may be relatively seldom and/or for a relatively few devices at the same time. The second state may not even be allowed and activated for all devices in need for it, and requesting it since there may first be made an evaluation by the wireless communication network 100, and e.g., prioritizations and/or decision making, based on the request before allowing activation. Further, in the second state, the provided coverage may be temporary, on demand only when needed for a device, used for relatively few devices and the provided coverage may typically be more narrow, e.g., thanks to active beam-tracking. Hence, thanks to embodiments herein, it may be enabled to provide power savings and increased flexibility of which devices to spend power on.

Moreover, embodiments herein and the possibility to allow which devices that may be able to receive coverage in difficult locations enable operators to provide highly reliable and prioritized connectivity as a service. Such services may e.g., be interesting for people going on hikes in wilderness areas or sailing at sea. Embodiments herein may also be used to prioritize public safety functions, e.g. police officers, fire fighters, ambulance personnel, or any other type of usage which have significantly higher requirements on network connectivity than other, e.g. normal, UEs might have.

Figure 3:
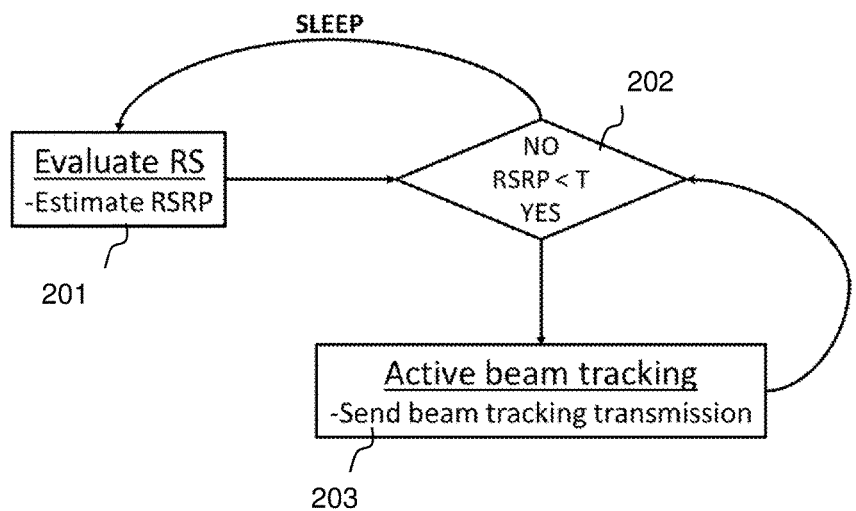

FIG. 3 schematically illustrates some actions and relations for a UE, as a particular example of the communication device 120, operating according to some embodiments herein, where the UE performs some actions in a first state, 201, 202, may switch to a second state 202, 203, and may switch back to the first state, as indicated by the arrows in the Figure. The UE may thus monitor a first reference signal that may be a wide-beam, see 201. If this first reference signal is not below the threshold, see 202, the UE may "go back to sleep", as indicated by the top curved arrow. However, if this first reference signal is below threshold, see 202, the UE may switch state, to the second state, and participate in active beam-tracking, see 203, and e.g. participate in tracking a second beam. The second, e.g., active beam-tracking, state may include that the UE requests the second, active beam-tracking, state from the network. Then, for example, according to a timer, and/or using a further request, the second, active beam-tracking state may deactivated and/or there may be a switch back to the first state. It may be noted that actions according to the first state may continue to be ongoing when the UE is operating in and according to the second state.

Embodiments of a second method, performed by the first network node 110, for managing beam coverage of the communication device 120, will now be described with reference to the flowchart depicted depicted in FIG. 4. The first network node 110 and the communication device 120 are comprised in the wireless communication network 100.

The method may comprise the actions described below. In some embodiments all the actions may be performed. One or more embodiments may be combined, where applicable. All possible combinations are not described to simplify the description. Note that shown actions may be taken in any suitable order and/or be carried out fully or partly overlapping in time when this is possible and suitable. Dotted lines attempt to illustrate features that are not present in all embodiments.

Any of the actions below may fully or partly involve and/or be initiated and/or be triggered by another, e.g. external, entity or entities, such as device and/or system, than what may actually be carrying out the actions. Such initiation may e.g. be triggered by said another entity in response to a request from the wireless communication network and/or in response to some event resulting from commutations and/or program code executing in said another entity or entities. Said another entity or entities may correspond to or be comprised in a so called computer cloud, or simply cloud, and/or communication with said another entity or entities may be accomplished by means of one or more cloud services.

The detailed description of some of the following corresponds to the same references provided above, in relation to the actions described for the communication device 120, and will thus not be repeated here to simplify the description. For example, the one or more first reference signals may be CSI-RSs and/or a MRSs. The one or more second reference signals may be CSI-RS.

Action 401

In order to manage beam coverage of the communication device 120 in the wireless communications network 100, e.g. for supporting provision of beam coverage for the communication device 120, without unnecessary signalling and unnecessary usage of energy, in this Action 401, the first network node 110 transmits the one or more first reference signals. The one or more first reference signals are comprised in the one or more first beams 125. The one or more first beams 125 are static or semi-static beams, as described earlier.

Action 402

In this Action 402, the first network node 110 receives, from the communication device 120, the request requesting the certain procedure for providing, by beamforming, the one or more second beams 127, 128 specifically to target the communication device 120. The requested one or more second beams 127, 128 comprise the one or more second reference signals.

Action 403

In some embodiments, the first network node 110 may, in this Action 403, determine based on the received request, and at least one of: a status, a class and a type of the communication device 120, whether or not to participate in setting up and/or in performing the certain procedure. A status of the communication device 120 may be understood herein as a capability status of the communication device 120 belonging to a certain class/type/category. That is, certain capabilities may be optional within a class/type/category and may it be signalled to the first network node 110 if these capabilities are supported or not. Status may also be understood as a current configuration with respect to the inactive and active state. This may include a current Discontinuous Transmission (DTX)/Discontinuous Reception (DRX) configuration, a numerology and mobility procedure of the communication device 120. A class of the communication device 120 may be understood herein as a UE category and/or UE capability. A type of the communication device 120 may be understood herein as a UE supporting a type of service, e.g., Ultra-Reliable Low-Latency Communication (URLLC), coverage enhancement etc. That the first network node 110 may determine based on the received request, and at least one of: a status, a class and a type of the communication device 120, whether or not to participate in setting up and/or in performing the certain procedure may be understood as follows. For example, if the communication device 120 supports reciprocity based beamforming, the first network node 110 may use a different certain procedure than if the communication device 120 does not support it. In another example, depending on the priority of the service class, the first network node 110 may decide whether or not to set up active beam-tracking. If the communication device 120 is non-prioritized, the first network node 110 may be decide, for example, on which time-resolution the active beam-tracking may take place.

Action 404

In this Action 404, the first network node 110 participates, based on the received request, in performing the certain procedure. The first network node 110 actively participates with the communication device 120 in the provision of beam coverage for the communication device 120, in the battery-saving mode for the communication device 120, as described earlier in relation to Action 203.

According to the foregoing, in this Action 404, the first network node 110, in the certain procedure, may actively participate with the communication device 120 in the provision of the beam coverage for the communication device 120 by performing one or more the following: a) receiving the UL RS from the communication device 120, and using it to calculate a reciprocity based DL pre-coder; b) transmitting the set of DL RS beam-formed, and receiving the report from the communication device 120 on at least the best such beam-formed DL RS; c) transmitting the DL RS to the communication device 120; d) transmitting the plurality of DL RS to the communication device 120 and receiving the report of the at least one pre-coder from the communication device 120 based on the transmitted plurality of DL RS; e) receiving the plurality of UL RS and transmitting the report of at least one pre-coder to the communication device 120 based on the transmitted plurality of UL RS; f) receiving the at least one UL-RS periodically, wherein omission of the UL-RS starts the timer for deactivating the second state; g) receiving the periodic beam-tracking report in the UL; h) transmitting the deactivation from the first network node 110; i) transmitting the periodic beam-tracking report in the DL to the communication device 120; j) transmitting a value of a non-beamformed RS in the beam-tracking report to the communication device 120; k) evaluating value of the standard measurement RS in the report from the communication device 120 to determine if deactivation should be performed; l) transmitting the beam-tracking report to the communication device 120 containing the field for requesting deactivation of the second state; and m) transmitting the beam-tracking report containing the field with the value of the non-beam formed UL-RS.

In some embodiments, the first network node 110 may receive the periodic beam-tracking report in the UL from the communication device 120 and one or more the following may apply: a) the beam-tracking report from the communication device 120 may contain the field for requesting deactivation of the second state; and b) the beam-tracking report from the communication device 120 may contain the field with measurements of the standard measurement RS.

In some embodiments, wherein the first network node 110 may transmit the periodic beam-tracking report to the communication device 120, one or more the following may apply: a) the beam-tracking report from the first network node 110 may contain the field for requesting deactivation of the second state; and b) the beam-tracking report from the first network node 110 may contain the field with the value of the non-beamformed UL RS.

Action 405

In some embodiments, the first network node 110 may, in this Action 405, transmit, as part of performing the certain procedure, the one or more second reference signals comprised in the requested one or more second beams 127, 128.

Figure 2:
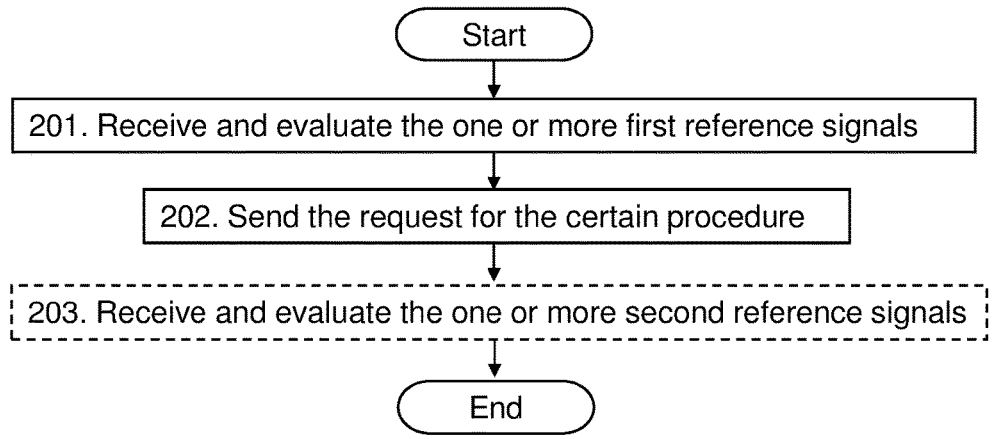
Figure 4:
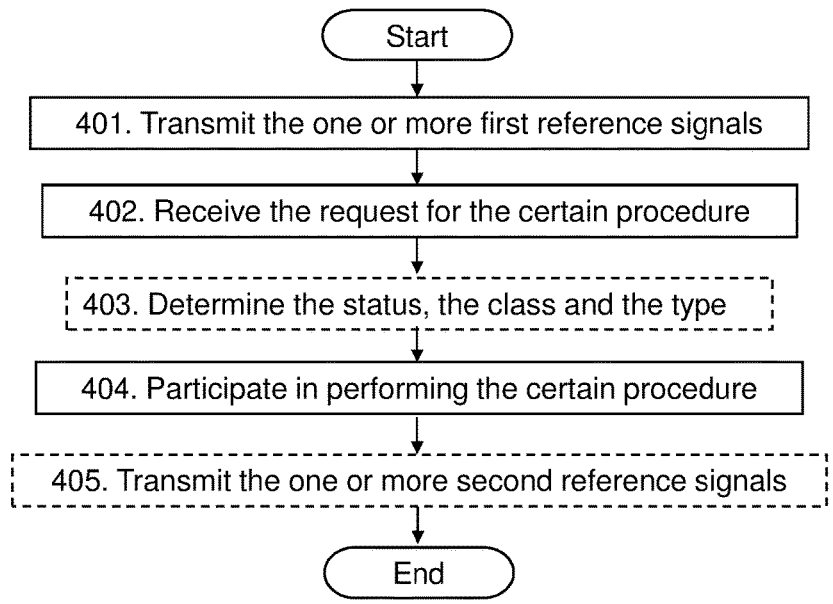
Figure 5:
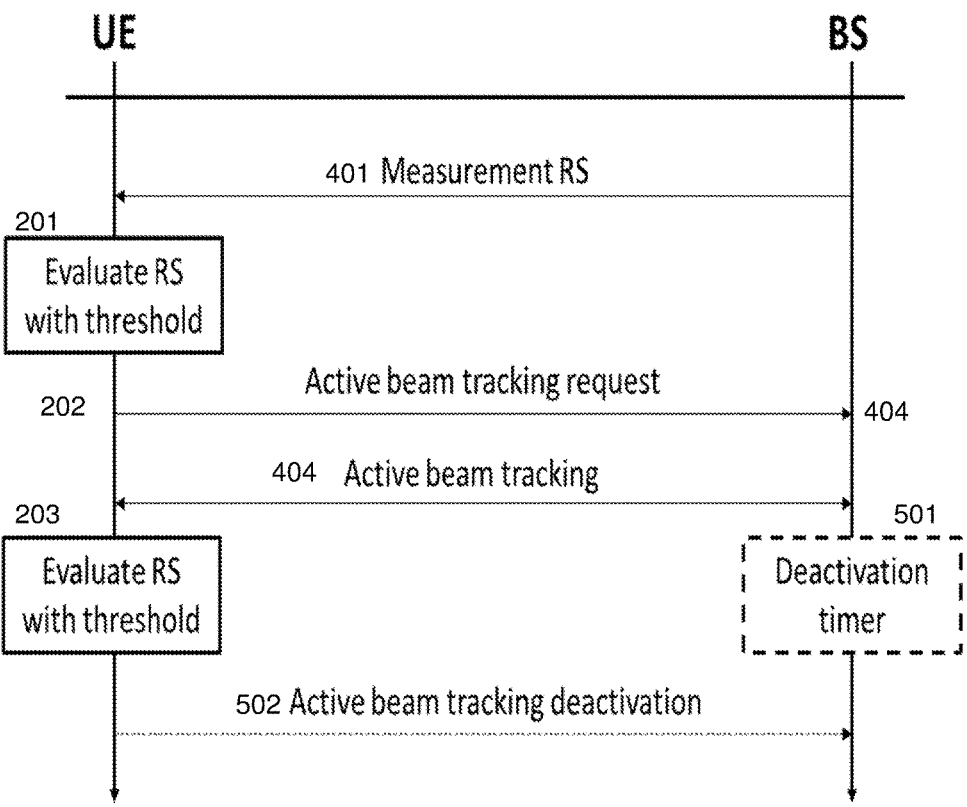

FIG. 5 schematically, in a combined signaling diagram and flowchart, illustrates various actions and relations in embodiments herein, using the reference numerals of FIGS. 2 and 4 corresponding to the actions indicated in the diagram. Note that not all shown actions are part of all embodiments although they may be in some, and that various combinations are possible. It should be noted that embodiments herein enable the communication device 120, in this example a UE, to request and/or start active beam-tracking when moving out of coverage using a normal access procedure, e.g. out of coverage of the wide-beams and the first reference signals, but that the UE may not be able to do a random access from the position that it has moved to. Hence, the UE may need to, before that happens, be preferably kept in a more active beam-tracking state, e.g., the second or active beam-tracking state, that may be part of a dormant mode, to maintain connectivity. This active beam-tracking, i.e. in the second or active beam-tracking state, may e.g., be using multiple reference signals transmitted by the network, e.g. base station, performing the beam-forming, to perform beam-tracking, and/or use a method were the UE may transmits reference signals to enable and be part of reciprocity based beam-forming. In the action numbered 501, the first network node 110, in this example a BS, starts a timer for deactivating the beam-tracking procedure, in agreement with the embodiments described above. As also described above, in some embodiments, the UE beam-tracking report may comprise the field for and/or a request requesting deactivation of the active-beam-tracking procedure, as indicated in the Figure as action 502.

Advantages of embodiments herein include that coverage of the first reference signals, such as of wide-beams, may be tuned to a lower coverage than the maximum coverage of the system. Hence, if coverage is possible in the basement of a house with an additional 20 dB penetration loss, this position may not need to be covered unless requested by a UE. Hence, lower overhead is made possible for the first reference signals and/or of the beams, typically wide beams, comprising them, than would be the case conventionally for idle state UEs.

Embodiments herein may also be used to facilitate battery savings in UEs that may need to receive e.g. periodically transmitted signals from the network. By enabling "active tracking mode" for a UE in idle state, the Signal to Interference Noise Ratio, SINR, of signals that would otherwise be broadcasted may be significantly increased, enabling the UE to receive these channels much faster and then go back to sleep again. For UEs that may be configured to have a very long battery life time, e.g. several years, such as in the case of a UE that is a MTC device, this benefit may double the UE battery life, e.g. extending it from 5 years to 10 years in a bad coverage location.

Figure 6:
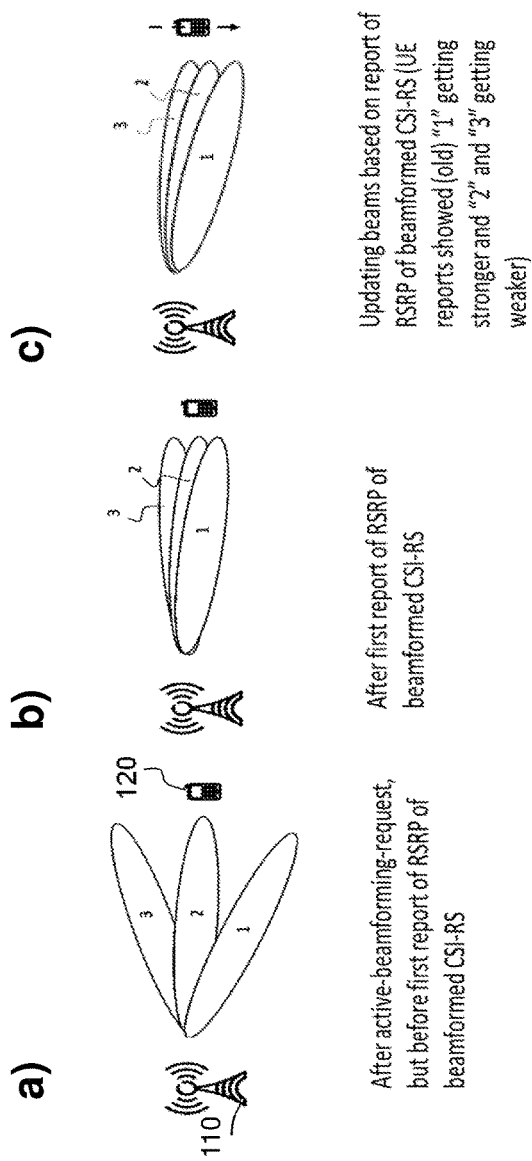

A non-limiting example of embodiments herein will now be presented in FIG. 6, where the first network node 110 is a gNB and the communication device 120 is a UE. FIG. 6 schematically illustrates a procedure for how beamforming may be used, e.g. for the second state, in a gNB capable of forming a large number of beams. Some embodiments may involve a situation where a gNB, that is, a 5G name for a node acting as a base station, cf. eNB in LTE, transmits a CSI-RS or Mobility Reference Signal, or Symbols, (MRS), that may be comprised in a wide-beam and may be non-beamformed, as a first reference signal, which UEs in dormant mode or state monitors, e.g. in the first, passive state. The CSI-RS/MRS may in this case not be used by the UE to perform channel estimates but for estimating Reference Signal Received Power (RSRSP). As long as the RSRP is above some threshold, such a UE may not need and should not contact the network. But, if the RSRP falls below the threshold, the UE may transmit an active-beam-tracking-request that indicates to network that beamforming is required to avoid risking losing ability to at low cost initiate connection with the UE. The network responds to the request by assigning to the UE one or more CSI-RS Measurement Resources (CSI-RS MRs) on which the network then may transmit CSI-RS, being second reference signal(s), towards the UE. The second reference signals may be comprised in beams subject to active beam forming. The assigning may in some embodiments be a semi-static configuration of resource the UE may perform measurements on, and/or in some embodiments be dynamic assignments of CSI-RS MR, e.g. by sending assignments in a DCI (Downlink Control Information) message. A semi-static configuration may typically take longer to configure, but the configuration may be valid for a longer time than a dynamic assignment that may only be valid for a much shorter time e.g. one or a few sub-frames.

In NR, it is also discussed to do this dynamically, that is, in a DCI, and this may only be valid for a short time e.g., one sub-frame, or a few.

The UE may still be in the dormant mode or state, but switch to the second, active beam-tracking, mode, as described in Action 202. It may still operate in a power saving, i.e. battery-saving, mode where data cannot be transmitted or received in a throughput optimal way. The UE may in the second state, e.g., only report, in the uplink, RSRP of the second reference signal(s), e.g., beamformed CSI-RS, corresponding to RSRP quality of a number of beams that may have been provided, e.g. selected, by the gNB.

In the second state, in some embodiments, e.g., where the number of beams possible and/or used may be large, the gNB may select a subset of beams in various directions, as depicted by the ovals 1, 2, 3, in panel a) in the figure. Then, e.g., based on the reported RSRP, the gNB may determine another subset of beams "closer" to each other, as depicted by the ovals 1, 2, 3, in panel b) in the figure. When these have been selected, the gNB may assign this new subset to the UE to instead perform the RSRP measurements on. This way, it may be made sure that the UE continues to be sufficiently covered by a beam. Later reports from the UE may then show that some beams are getting weaker and some are getting stronger due to UE mobility, which causes the gNB to select another beamforming and/or other beamformed CSI-RS that the UE is assigned to perform RSRP measurements on as depicted by the ovals 1, 2, 3, in panel c) in the figure.

Figure 7:
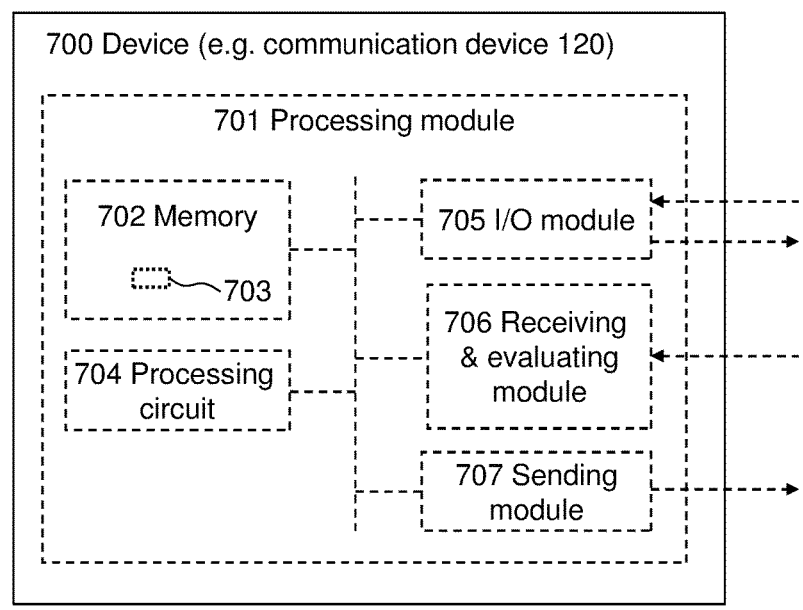

FIG. 7 is a schematic block diagram for illustrating embodiments of a device 700, that may be the communication device 120, and how the communication device 120 may be configured to perform the method and/or one or more actions described herein in connection with FIG. 2. The description herein of the device 700 will be made in reference to the communication device 120. However, any description of the communication device 120 may be understood to equally apply to the device 700.

Accordingly, the communication device 120, is configured to manage beam coverage of the communication device 120 in the wireless communication network 100.

Hence, the communication device 120 may comprise:

A processing module 701, such as a means, one or more hardware modules, including e.g. one or more processors, and/or one or more software modules for performing said methods and/or actions.

A memory 702, which may comprise, such as contain or store, a computer program 703. The computer program 703 comprises 'instructions' or 'code' directly or indirectly executable by the communication device (120) so that it performs the said methods and/or actions. The memory 702 may comprise one or more memory units and may be further be arranged to store data, such as configurations and/or applications involved in or for performing functions and actions of embodiments herein.

A processing circuit 704 as an exemplifying hardware module and may comprise or correspond to one or more processors. In some embodiments, the processing module 701 may comprise, e.g. 'is embodied in the form of' or 'realized by' the processing circuit. In these embodiments, the memory may comprise the computer program executable by the processing circuit, whereby the node comprising it is operative, or configured, to perform said method and/or actions. The computer program 703, comprises instructions which, when executed on at least one processing circuit 704, cause the at least one processing circuit 704 to carry out the method according to FIG. 2.

An Input/Output (I/O) module 705, configured to be involved in, e.g. by performing, any communication to and/or from other units and/or nodes, such as sending and/or receiving information to and/or from other external nodes or devices. The I/O module may be exemplified by an obtaining, e.g. receiving, module and/or a sending module, when applicable.

The communication device 120 may also comprise other exemplifying hardware and/or software module(s) as may have been described elsewhere in the present disclosure, which module(s) may be fully or partly implemented by the respective processing circuit. For example, the communication device 120 may further comprise a receiving and evaluating module 706, and/or a sending module 707.

Hence, the communication device 120 and/or the processing module 701 and/or the processing circuit 704 and/or the I/O module 705 and/or the receiving & evaluating module 706 may be operative, or configured, to receive and evaluate the one or more first reference signals configured to be transmitted by the first network node 110 comprised in the wireless communication network 100. The one or more first reference signals are configured to be comprised in the one or more first beams 125. The one or more first beams 125 are configured to be static or semi-static beams. To receive and to evaluate is configured to be according to the first state of the communication device 120, wherein when in the first state, the communication device 120 is configured to refrain from reporting back in the uplink about the received and evaluated one or more first reference signals.

The communication device 120 and/or the processing module 701 and/or the processing circuit 704 and/or the I/O module 705 and/or the sending module 707 may be operative, or configured, to perform, in response to the evaluation having resulted in a conclusion that all of the received one or more first reference signals are too weak and/or of too low quality by comparison to a threshold value, send the request to the one or more network nodes 110, 111, requesting the certain procedure for providing, by beamforming, the one or more second beams 127, 128 specifically to target the communication device 120. The one or more second beams 127, 128 configured to be requested comprise the one or more second reference signals. The communication device 120 is configured to switch, based on the evaluation, from the first state to the second state, wherein the communication device 120 in the second state is configured to actively participate in the provision of beam coverage for the communication device 120. In the second state, the communication device 120 is configured to be in a battery-saving mode.

In some embodiments, the communication device 120 and/or the processing module 701 and/or the processing circuit 704 and/or the I/O module 705 and/or the receiving & evaluating module 706 may be operative, or configured, to receive and evaluate, in response to the request configured to be sent, the one or more second reference signals configured to be comprised in the requested one or more second beams 127, 128 configured to be transmitted by the one or more network nodes 110, 111.

The communication device 120, in said certain procedure, may be configured to actively participate in the provision of beam coverage for the communication device 120 by performing one or more the following: a) transmitting the UL RS; b) measuring on the set of DL RS beam-formed, and reporting on at least the best such beam-formed DL RS; c) receiving the DL RS from at least one of the one or more network nodes 110, 111 and using the received DL RS to calculate a reciprocity based UL precoder; d) receiving the plurality of DL RS from at least one of the one or more network nodes 110, 111 and using the received plurality of DL RS to calculate and report at least one pre-coder; e) transmitting the plurality of UL RS, and receiving the report of at least one pre-coder from at least one of the one or more network nodes 110, 111 based on said transmitted plurality of UL RS; f) transmitting at least one UL RS periodically, wherein omission of said UL RS starts the timer for deactivating the second state; g) sending the periodic beam-tracking report in the UL; h) receiving the deactivation from at least one of the one or more network nodes 110, 111; i) receiving the periodic beam-tracking report from at least one of the one or more network nodes 110, 111; and j) evaluating the value of the non-beamformed RS in the beam-tracking report from at least one of the one or more network nodes 110, 111 to determine the UL power setting for the second state.

In some embodiments, the communication device 120 may be configured to send the periodic beam-tracking report in the UL and one or more the following may apply: a) the beam-tracking report from the communication device 120 is configured to contain the field for requesting deactivation of the second state; and b) the beam-tracking report from the communication device 120 is configured to contain the field with measurements of the standard measurement RS.

The communication device 120 may be configured to receive the periodic beam-tracking report from at least one of the one or more network nodes 110, 111, wherein one or more the following may apply: a) the beam-tracking report from at least one of the one or more network nodes 110, 111 contains the field for requesting deactivation of the second state; and b) the beam-tracking report from at least one of the one or more network nodes 110, 111 contains the field with a value of the non-beamformed UL RS.

In some embodiments, the one or more second reference signals may be CSI-RS.

Figure 8:
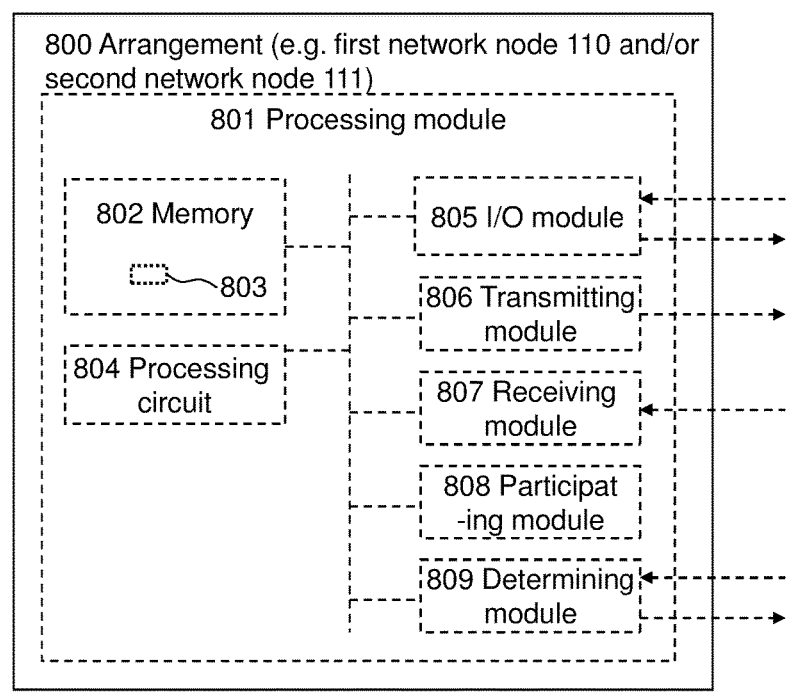

FIG. 8 is a schematic block diagram for illustrating embodiments of an arrangement 800 that may be the first network node 110, and how the first network node 110 may be configured to perform the method and/or one or more actions described herein in connection with FIG. 4. The description herein of the arrangement 800 will be made in reference to the first network node 110. However, any description of the first network node 110 may be understood to equally apply to the arrangement 800. Accordingly, the first network node 110 is configured to manage beam coverage of the communication device 120. The first network node 110 and the communication device 120 are configured to be comprised in the wireless communication network 100

Hence, the first network node 110 may comprise:

A processing module 601, such as a means, one or more hardware modules, including e.g. one or more processors, and/or one or more software modules for performing said methods and/or actions.

A memory 802, which may comprise, such as contain or store, a computer program 803. The computer program comprises 'instructions' or 'code' directly or indirectly executable by the respective network node so that it performs the said methods and/or actions. The memory 802 may comprise one or more memory units and may be further be arranged to store data, such as configurations and/or applications involved in or for performing functions and actions of embodiments herein.

A processing circuit 804 as an exemplifying hardware module and may comprise or correspond to one or more processors. In some embodiments, the processing module may comprise, e.g. 'is embodied in the form of' or 'realized by' the processing circuit. In these embodiments, the memory may comprise the computer program executable by the processing circuit, whereby the node comprising it is operative, or configured, to perform said method and/or actions. The computer program 803, comprises instructions which, when executed on at least one processing circuit 804, cause the at least one processing circuit 804 to carry out the method according to FIG. 4.

An Input/Output (I/O) module 805, configured to be involved in, e.g. by performing, any communication to and/or from other units and/or nodes, such as sending and/or receiving information to and/or from other external nodes or devices. The I/O module may be exemplified by an obtaining, e.g. receiving, module and/or a sending module, when applicable.

The first network node 110 may also comprise other exemplifying hardware and/or software module(s) as may have been described elsewhere in the present disclosure, which module(s) may be fully or partly implemented by the respective processing circuit 804. For example, the first network node 1100 may further comprise a transmitting module 806, a receiving module 807, a determining module 808 and/or a participating module 809.

The first network node 110 and/or the processing module 801 and/or the processing circuit 804 and/or the I/O module 805 and/or the transmitting module 806 are operative, or configured, to transmit the one or more first reference signals, said one or more first reference signals being configured to be comprised in the one or more first beams 125, said one or more first beams 125 being configured to be static or semi-static beams.

The first network node 110 and/or the processing module 801 and/or the processing circuit 804 and/or the I/O module 805 and/or the receiving module 807 are operative, or configured, to receive, from the communication device 120, the request requesting the certain procedure for providing, by beamforming, the one or more second beams 127, 128 specifically to target the communication device 120. The one or more second beams 127, 128 are configured to comprise the one or more second reference signals.

The first network node 110 and/or the processing module 801 and/or the processing circuit 804 and/or the participating module 808 are operative, or configured, to participate, based on the request configured to be received, in performing said certain procedure. The first network node 110 is configured to actively participate with the communication device 120 in the provision of beam coverage for the communication device 120, in the battery-saving mode for the communication device 120.

The first network node 110 and/or the processing module 801 and/or the processing circuit 804 and/or the determining module 809 may be further operative, or configured, to determine, based on the request configured to be received, and at least one of: the status, the class and the type of the communication device 120, whether or not to participate in setting up and/or in performing said certain procedure.

In some embodiments, the first network node 110, in said certain procedure, may be configured to actively participate with the communication device 120 in the provision of beam coverage for the communication device 120 by performing one or more the following: a) receiving the UL the RS from the communication device 120, and using it to calculate the reciprocity based DL pre-coder; b) transmitting the set of DL RS beam-formed, and receiving a report from the communication device 120 on at least the best such beam-formed DL RS; c) transmitting the DL RS to the communication device 120; d) transmitting the plurality of DL RS to the communication device 120 and receiving the report of at least one pre-coder from the communication device 120 based on the transmitted plurality of DL RS; e) receiving the plurality of UL RS and transmitting the report of at least one pre-coder to the communication device 120 based on the transmitted plurality of UL RS; f) receiving at least one UL-RS periodically, wherein omission of the UL-RS starts the timer for deactivating the second state; g) receiving the periodic beam-tracking report in the UL; h) transmitting the deactivation from the first network node 110; i) transmitting the periodic beam-tracking report in the DL to the communication device 120; j) transmitting the value of the non-beamformed RS in the beam-tracking report to the communication device 120; k) evaluating the value of the standard measurement RS in a report from the communication device 120 to determine if deactivation should be performed; l) transmitting the beam-tracking report to the communication device 120 containing the field for requesting deactivation of the second state; and m) transmitting the beam-tracking report containing the field with a value of the non-beam formed UL-RS.

In some embodiments, the first network node 110 may be configured to receive the periodic beam-tracking report in the UL from the communication device 120, and one or more the following may apply: a) the beam-tracking report from the communication device 120 may contain the field for requesting deactivation of the second state; and b) the beam-tracking report from the communication device 120 may contain the field with measurements of the standard measurement RS.

The first network node 110 may be configured to transmit the periodic beam-tracking report to the communication device 120, and in some embodiments, one or more the following may apply: a) the beam-tracking report from the first network node 110 may be configured to contain the field for requesting deactivation of the second state; and b) the beam-tracking report from the first network node 110 may be configured to contain the field with a value of the non-beamformed UL RS.

The first network node 110 and/or the processing module 801 and/or the processing circuit 804 and/or the I/O module 805 and/or the transmitting module 806 may be operative, or configured, to transmit, as part of performing said certain procedure, the one or more second reference signals configured to be comprised in the requested one or more second beams 127, 128.

In some embodiments, the one or more second reference signals are CSI-RS.

Figure 9A:
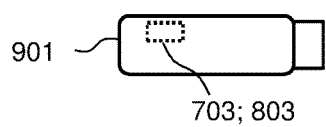
FIGS. 9a-c are schematic drawings illustrating embodiments relating to computer programs and computer readable media to cause the communication device and/or network node to perform, respectively, methods according to embodiments herein.
Figure 9B:
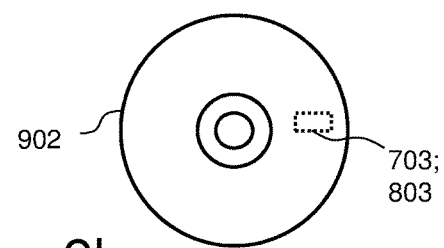
Figure 9C:
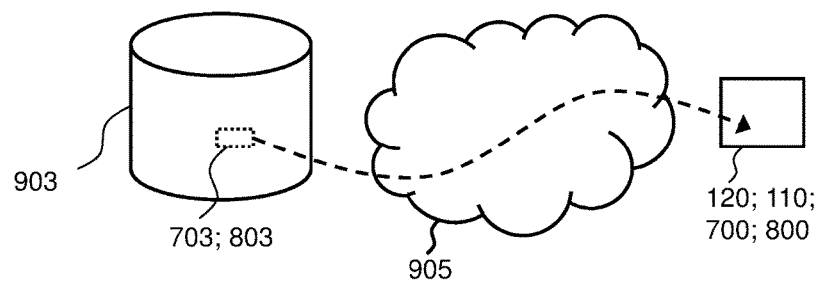

FIGS. 9a-c are schematic drawings illustrating embodiments relating to a computer program that may be any one of the computer programs 703 and 803, and that comprises instructions that when executed by the respective processing circuit causes the node comprising it to perform the respective method as described above.

In some embodiments there is provided a computer program product, i.e. a data carrier, comprising a computer-readable medium and the computer program stored on the computer-readable medium. Hence, a computer-readable medium, having stored thereon a computer program 703, comprising instructions which, when executed on at least one processing circuit 704, cause the at least one processing circuit 704 to carry out the method according to FIG. 2. Similarly, a computer-readable medium, having stored thereon the computer program 803, comprises instructions which, when executed on the at least one processing circuit 804, causes the at least one processing circuit 804 to carry out the method according to FIG. 4. By computer readable medium may be excluded a transitory, propagating signal and the computer readable medium may correspondingly be named non-transitory computer readable medium. Non-limiting examples of the computer-readable medium is a memory card or a memory stick 901 as in FIG. 9a, a disc storage medium 902 such as a CD or DVD as in FIG. 9b, a mass storage device 903 as in FIG. 9c. The mass storage device 903 is typically based on hard drive(s) or Solid State Drive(s) (SSD). The mass storage device 903 may be such that is used for storing data accessible over a computer network 905, e.g. the Internet or a Local Area Network (LAN).

The computer programs, respectively, may furthermore be provided as a pure computer program or comprised in a file or files. The file or files may be stored on the computer-readable medium and e.g. available through download e.g. over the computer network 905, such as from the mass storage device 903 via a server. The server may e.g. be a web or File Transfer Protocol (FTP) server. The file or files may e.g. be executable files for direct or indirect download to and execution on the a node for carrying out a method, e.g. by the processing circuit, or may be for intermediate download and compilation to make them executable before further download and execution causing the node(s) to perform the respective method as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first node and the second node to be configured to and/or to perform the above-described methods, respectively.

Identification by any identifier herein may be implicit or explicit. The identification may be unique in the wireless communication network 100 or at least in a part or some area thereof.

The term "network", or simply "NW", as used herein typically, as should be realized without any information on the contrary, refer to the wireless communication network 100.

The term "UE", as used herein typically, as should be realized without any information on the contrary, refer to the communication device 120.

The term "network node" as used herein may as such refer to any type of radio network node (described below) or any network node, which may communicate with at least a radio network node. Examples of such network nodes include any radio network node stated above, a core network node, Operations & Maintenance (O&M), Operations Support Systems (OSS), Self Organizing Network (SON) node, positioning node etc.

The term "radio network node" as used herein may as such refer to any type of network node serving a wireless device and/or that are connected to other network node(s) or network element(s) or any radio node from which a wireless device receives signals. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

The term "communication device" or "wireless device" as used herein, may as such refer to any type of device arranged to communicate, e.g. with a radio network node, in a wireless, cellular and/or mobile communication system, such as the wireless communication network 100, and may thus be a wireless communication device. Examples include: target devices, device to device UE, device for Machine Type of Communication (MTC), MTC device, machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may as such refer to any type of network node or wireless device, such as described above.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that any enumerating terminology such as first network node, second network node, first base station, second base station, or similar, that may have been used herein, as such should be considering non-limiting and the terminology as such does not imply a certain hierarchical relation. Without any explicit information in the contrary, naming by enumeration should be considered merely a way of accomplishing different names.

Examples Related to Embodiments Herein

Examples related to embodiments herein may comprise:

A first method, performed by a device, e.g. the device 700, such as the communication device 120. The first method may be for managing beam coverage of the device in a wireless communication network, such as the wireless communication network 100, e.g. for supporting provision of beam coverage for the device.

The first method may comprise the actions of:

Receiving and evaluating one or more first reference signals transmitted by one or more network nodes, e.g. the first network node 110 and/or the second network node 111, comprised in the wireless communication network 100.

Sending, in response to the evaluation, a request to one or more network nodes of the wireless communication network, e.g. the first network node 110 and/or the second network node 111, requesting the certain procedure for providing one or more second beams, typically by beamforming, for supporting, e.g. enabling or improving the ability of, connecting the device to the wireless communication network. The connection may thus be established based on, such as accomplished by using, at least one of said one or more second beams.

In response to the evaluation, the communication device 120 may send a request to the one or more network nodes of the wireless communication network 100, e.g. the first network node 110 and/or the second network node 111, requesting the certain procedure for providing the one or more second beams 127, 128, typically by beamforming.

The present action, i.e. the sending of the request, may be part of that the device switches, or attempts to switch, based on the evaluation, from the first state to a second state, or mode, to operate in instead of the first state.

The first method may additionally comprise one or more further actions, e.g. one or more of the following:

Receiving and evaluating, in response to the sent request, one or more second reference signals comprised in the requested one or more second beams transmitted by one or more network nodes, e.g. the first network node 110 and/or the second network node 111, comprised in the wireless communication network 100. The one or more second reference signals may be in accordance with said one or more second reference signals as discussed above.

A second method, performed by an arrangement, e.g. the arrangement 800, or the wireless communication network, e.g. the wireless communication network 100, such as one or more nodes thereof, e.g. one or more of the first and second network nodes 110, 111. The second method may be for managing beam coverage of a device, e.g. the communication device 120, in the wireless communication network 100, e.g. for supporting provision of beam coverage for the device. The device may be located and configured to perform as described above for the first method.

Transmitting one or more first reference signals that may be as described above for the first method.

Receiving, from the device, a request requesting a certain procedure for providing one or more second beams 127, 128. The request, certain procedure and second beams 127, 128 etc., may be as described above for the first method.

The second method may additionally comprise one or more further actions, e.g. one or more of the following:

Determining, based on the request and/or a status, class and/or type of the device, whether or not to participate in setting up and/or in performing said certain procedure.

Participating, based on the request and/or the determination, in setting up and/or in performing said certain procedure.

Transmitting, as part of performing said certain procedure, one or more second reference signals comprised in the requested one or more second beams 127, 128. The one or more second reference signals may be as described above for the first method.

The invention claimed is:

1. A method, performed by a communication device, for managing beam coverage of the communication device in a wireless communication network, the method comprising:
   receiving and evaluating one or more first reference signals transmitted by a first network node of the wireless communication network, said one or more first reference signals being comprised in one or more first beams, said one or more first beams being static or semi-static beams, wherein said receiving and evaluating is according to a first state of the communication device in which the communication device refrains from reporting back in the uplink about the received and evaluated one or more first reference signals;
   upon evaluating, by comparison to a threshold value, that all of the received one or more first reference signals are too weak and/or of too low quality:
      sending a request, to one or more network nodes, for a certain procedure to provide, by beamforming, one or more second beams directed specifically to the communication device, wherein the requested one or more second beams comprise one or more second reference signals; and
      switching from the first state to a second state, the second state being a state in which the communication device is in a battery-saving mode and actively participates in providing the one or more second beams.

2. The method according to claim 1, wherein the method further comprises:
   receiving and evaluating, in response to the sent request, the one or more second reference signals comprising the requested one or more second beams transmitted by the one or more network nodes.

3. The method according to claim 1, wherein the communication device actively participates in providing the one or more second beams by one or more the following:
   transmitting an uplink (UL) reference signal (RS);
   measuring on a set of downlink (DL) RS beam-formed, and reporting on at least the best such beam-formed DL RS;
   receiving a DL RS from at least one of the one or more network nodes and using the received DL RS to calculate a reciprocity based UL precoder;
   receiving a plurality of DL RS from at least one of the one or more network nodes and using the received plurality of DL RS to calculate and report at least one pre-coder;
   transmitting a plurality of UL RS, and receiving a report of at least one pre-coder from at least one of the one or more network nodes based on said transmitted plurality of UL RS;
   transmitting at least one UL RS periodically, wherein omission of said UL RS starts a timer for deactivating the second state;
   transmitting a periodic beam-tracking report in the UL;
   receiving a deactivation from at least one of the one or more network nodes;
   receiving a periodic beam-tracking report from at least one of the one or more network nodes; and
   evaluating a value of a non-beamformed RS in a beam-tracking report from at least one of the one or more network nodes to determine an UL power setting for the second state.

4. The method according to claim 3, wherein the periodic beam-tracking report transmitted in the UL comprises one or more the following:
   a field for requesting deactivation of the second state; and
   a field with measurements of a standard measurement RS.

5. The method according to claim 3, wherein the periodic beam-tracking report received from at least one of the one or more network nodes comprises one or more the following:
   a field for requesting deactivation of the second state; and
   a field with a value of a non-beamformed UL RS.

6. The method according to claim 1, wherein the one or more second reference signals are Channel State Information Reference Signals (CSI-RS).

7. A non-transitory, computer-readable storage medium storing executable program instructions which, when executed on at least one processor, cause the at least one processor to carry out the method according to claim 1.

8. A method, performed by a first network node of a wireless communication network, for managing beam coverage of a communication device, the method comprising:
   transmitting one or more first reference signals, said one or more first reference signals being comprised in one or more first beams, said one or more first beams being static or semi-static beams;
   receiving, from the communication device, a request for a certain procedure to provide, by beamforming, one or more second beams specifically directed to the communication device, wherein the requested one or more second beams comprise one or more second reference signals, and
   based on the received request, actively participating, with the communication device, in performing the certain procedure to provide the one or more second beams while the communication device is in a battery-saving mode.

9. The method according to claim 8, wherein the method further comprises:
   determining whether or not to participate in setting up and/or in performing said certain procedure, based on the received request and on at least one of the following pertaining to the communication device: a status, a class, and a type.

10. The method according to claim 8, wherein the first network node actively participates with the communication device in providing the one or more second beams by one or more the following:
    receiving an uplink, UL, reference signal, RS, from the communication device, and using it to calculate a reciprocity based DL pre-coder;
    transmitting a set of DL RS beam-formed, and receiving a report from the communication device on at least the best such beam-formed DL RS;
    transmitting a DL RS to the communication device;
    transmitting a plurality of DL RS to the communication device and receiving a report of at least one pre-coder from the communication device based on the transmitted plurality of DL RS;

receiving a plurality of uplink, UL, RS and transmitting a report of at least one pre-coder to the communication device based on said transmitted plurality of UL RS;

receiving at least one UL-RS periodically, wherein omission of said UL-RS starts a timer for deactivating the second state;

receiving a periodic beam-tracking report in the UL;

transmitting a deactivation from the first network node;

transmitting a periodic beam-tracking report to the communication device;

transmitting a value of a non-beamformed RS in a beam-tracking report to the communication device;

evaluating a value of a standard measurement RS in a report from the communication device to determine if deactivation should be performed;

transmitting a beam-tracking report to the communication device containing a field for requesting deactivation of the second state; and transmitting a beam-tracking report containing a field with a value of a non-beam formed UL-RS.

11. The method according to claim 10, wherein the periodic beam-tracking report received in the UL comprises or more the following:
a field for requesting deactivation of the second state; and
a field with measurements of a standard measurement RS.

12. The method according to claim 10, wherein the periodic beam-tracking report transmitted to the communication device comprises one or more the following:
a field for requesting deactivation of the second state; and
a field with a value of a non-beamformed UL RS.

13. The method according to claim 8, wherein the method further comprises:
transmitting, as part of performing said certain procedure, the one or more second reference signals comprised in the requested one or more second beams.

14. The method according to claim 8, wherein the one or more second reference signals are Channel State Information Reference Signals, CSI-RS.

15. A non-transitory, computer-readable storage medium storing executable program instructions which, when executed on at least one processor, cause the at least one processor to carry out the method according to claim 8.

16. A communication device configured to manage beam coverage of the communication device in a wireless communication network, comprising:
at least one processor; and
at least one memory storing executable program instructions that, when executed by the at least one processor, configure the communication device to:
receive and evaluate one or more first reference signals transmitted by a first network node of the wireless communication network, said one or more first reference signals being comprised in one or more first beams, said one or more first beams being static or semi-static beams, wherein said receiving and evaluating is according to a first state of the communication device in which the communication device refrains from reporting back in the uplink about the received and evaluated one or more first reference signals;
upon evaluating, by comparison to a threshold value, that all of the received one or more first reference signals are too weak and/or of too low quality:
send a request, to one or more network nodes, for a certain procedure to provide, by beamforming, one or more second beams directed specifically to the communication device, wherein the requested one or more second beams comprise one or more second reference signals; and
switch from the first state to a second state, the second state being a state in which the communication device is in a battery-saving mode and actively participates in the provision of the one or more second beams.

17. The communication device according to claim 16, wherein execution of the program instructions further configure the communication device to:
receive and evaluate, in response to sending the request, the one or more second reference signals comprising the one or more second beams.

18. The communication device according to claim 16, wherein execution of the program instructions configure the communication device to actively participate in the provision of the one or more second beams by one or more the following:
transmitting an uplink, UL, reference signal, RS;
measuring on a set of DL RS beam-formed, and reporting on at least the best such beam-formed DL RS;
receiving a DL RS from at least one of the one or more network nodes and using the received DL RS to calculate a reciprocity based UL precoder;
receiving a plurality of DL RS from at least one of the one or more network nodes and using the received plurality of DL RS to calculate and report at least one pre-coder;
transmitting a plurality of UL RS, and receiving a report of at least one pre-coder from at least one of the one or more network nodes based on said transmitted plurality of UL RS;
transmitting at least one UL RS periodically, wherein omission of said UL RS starts a timer for deactivating the second state;
transmitting a periodic beam-tracking report in the UL;
receiving a deactivation from at least one of the one or more network nodes;
receiving a periodic beam-tracking report from at least one of the one or more network nodes; and
evaluating a value of a non-beamformed RS in a beam-tracking report from at least one of the one or more network nodes to determine an UL power setting for the second state.

19. The communication device according to claim 18, wherein the periodic beam-tracking report transmitted in the UL comprises one or more the following:
a field for requesting deactivation of the second state; and
a field with measurements of a standard measurement RS.

20. The communication device according to claim 18, wherein the periodic beam-tracking report received from at least one of the one or more network nodes comprises one or more the following:
a field for requesting deactivation of the second state; and
a field with a value of a non-beamformed UL RS.

21. The communication device according to claim 16, wherein the one or more second reference signals are Channel State Information Reference Signals, CSI-RS.

22. A first network node configured to manage beam coverage of a communication device, the first network node and the communication device being associated with a wireless communication network, the first network node comprising:
at least one processor; and
at least one memory storing executable program instructions that, when executed by the at least one processor, configure the first network node to:

transmit one or more first reference signals, said one or more first reference signals being configured to be comprised in one or more first beams, said one or more first beams being configured to be static or semi-static beams, receive, from the communication device, a request for a certain procedure to provide, by beamforming, one or more second beams specifically directed to the communication device, wherein the one or more second beams are configured to comprise one or more second reference signals, and based on the received request, actively participate, with the communication device, in performing the certain procedure to provide the one or more second beams while the communication device is in a battery-saving mode.

23. The first network node according to claim 22, wherein execution of the program instructions further configured the first network node to:

determine whether or not to participate in setting up and/or in performing said certain procedure, based on the received request and at least one of following pertaining to the communication device: a status, a class, and a type.

24. The first network node according to claim 22, wherein execution of the program instructions configure the first network node to actively participate with the communication device in the provision of the one or more second beams by one or more the following:

receiving an uplink, UL, reference signal, RS, from the communication device, and using it to calculate a reciprocity based DL pre-coder;

transmitting a set of DL RS beam-formed, and receiving a report from the communication device on at least the best such beam-formed DL RS;

transmitting a DL RS to the communication device;

transmitting a plurality of DL RS to the communication device and receiving a report of at least one pre-coder from the communication device based on the transmitted plurality of DL RS;

receiving a plurality of uplink, UL, RS and transmitting a report of at least one pre-coder to the communication device based on said transmitted plurality of UL RS;

receiving at least one UL-RS periodically, wherein omission of said UL-RS starts a timer for deactivating the second state;

receiving a periodic beam-tracking report in the UL;

transmitting a deactivation from the first network node;

transmitting a periodic beam-tracking report to the communication device;

transmitting a value of a non-beamformed RS in a beam-tracking report to the communication device;

evaluating a value of a standard measurement RS in a report from the communication device to determine if deactivation should be performed;

transmitting a beam-tracking report to the communication device containing a field for requesting deactivation of the second state; and transmitting a beam-tracking report containing a field with a value of a non-beam formed UL-RS.

25. The first network node according to claim 24, wherein the periodic beam-tracking report received in the UL comprises one or more the following:

a field for requesting deactivation of the second state; and a field with measurements of a standard measurement RS.

26. The first network node according to claim 24, wherein the periodic beam-tracking report transmitted to the communication device comprises one or more the following:

a field for requesting deactivation of the second state; and a field with a value of a non-beamformed UL RS.

27. The first network node according to claim 22, wherein execution of the program instructions further configure the first network node to:

transmit, as part of performing said certain procedure, the one or more second reference signals comprising the one or more second beams.

28. The first network node according to claim 22, wherein the one or more second reference signals are Channel State Information Reference Signals, CSI-RS.

* * * * *